May 23, 1950  W. D. CROCKER  2,508,497
IMPULSE COUPLING
Filed May 8, 1946
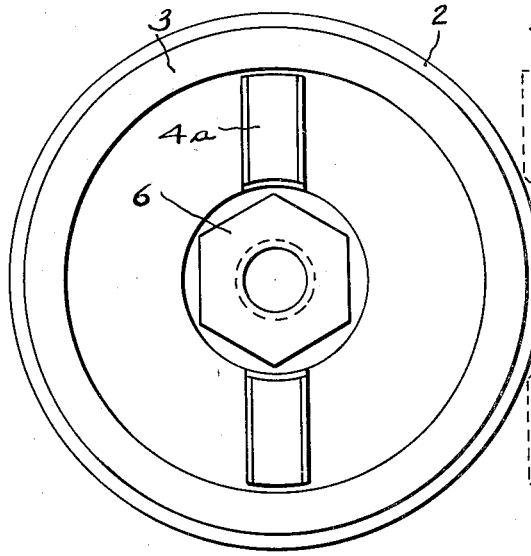
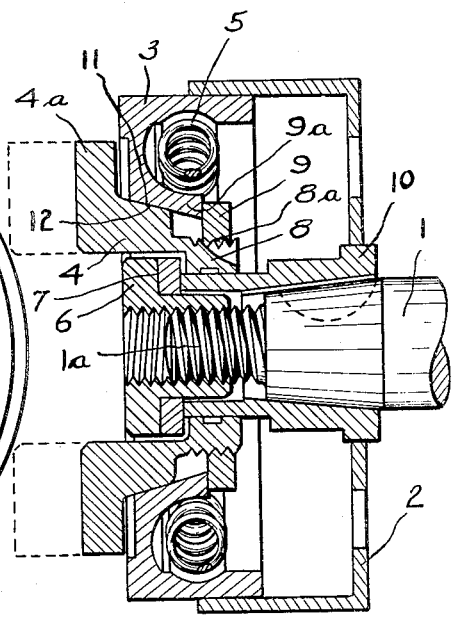
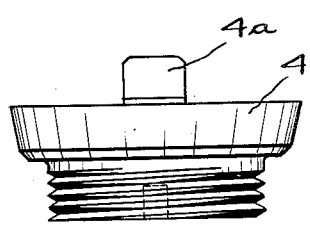
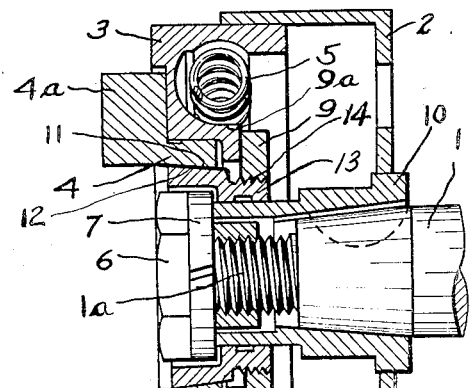
INVENTOR.
WILLIAM D. CROCKER.
BY
Raymond A. Paquin
ATTORNEY.

Patented May 23, 1950

2,508,497

UNITED STATES PATENT OFFICE 2,508,497

IMPULSE COUPLING

William D. Crocker, Suffield, Conn., assignor to American Bosch Corporation, Springfield, Mass., a corporation of New York Application May 8, 1946, Serial No. 668,293

4 Claims. (Cl. 171—209)

1

This invention relates to new and useful improvements in impulse couplings adapted for use in connection with magnetos or electric generators supplying ignition current to internal combustion engines or the like.

In the application of a magneto with an impulse coupling to facilitate starting of the engine, the driving lugs or tongues of the impulse coupling engage a slot in the timing gear of the engine for operative connection therewith.

Due to the fact that the timing gears are of necessity in fixed relation with the engine to properly time the engine and the impulse coupling is also in fixed relation with the magneto to which it is attached, for properly timing the same, considerable difficulty has been encountered in connecting the driving lugs or tongues of the impulse coupling with the slot therefor in the engine timing gear. In the case of base mounted magnetos it has been possible with considerable difficulty to align the driving lugs or tongues with the timing gear slot but this is not possible with flange mounted magnetos therefore making necessary the provision of driving members or coupling flanges with the lugs or tongues in numerous positions to insure having the proper one for each installation. This difficulty has been further increased because of the fact that some of the installations were for clockwise rotation and others for anti-clockwise rotation thus further increasing the number of parts necessary to have on hand to make it possible to accommodate all possible desired installations.

It is therefore the principal object of the present invention to provide an impulse coupling which will overcome the prior art difficulties enumerated above and which is capable of easy and quick adjustment to meet all desired installations including the mounting for clockwise and anti-clockwise rotation and which is simple and economical in construction and efficient in operation.

Other objects and advantages of the invention will be apparent from the following description taken in connection with the accompanying drawings and it will be understood that many changes may be made in the details of construction and arrangements of parts shown and described.

Referring to the drawings:

Fig. 1 is a front view of an impulse coupling embodying the invention;

Fig. 2 is an axial section thereof;

Fig. 3 is a view similar to Fig. 2 but showing a slightly different form of the invention; and Fig. 4 is a side view of the coupling flange.

Referring more particularly to the drawings

2 wherein similar reference characters designate corresponding parts throughout the several views 1 is the magneto shaft on which the impulse coupling is mounted and having the threaded end 1a. 2 is the arrester plate having openings for bolting to the magneto housing and adapted to contain the usual weights, not shown, on the hub 10 which is keyed to the shaft. The housing 3 contains the usual spiral spring 5.

In the form of the invention shown in Figs. 2 and 4, the driving member comprises an annular member 4 having the driving lugs 4a and having a collar 8 adapted to slidably fit on the hub 10 and having the externally threaded portion 8a adapted to engage the nut 9.

The housing has the annular tapered surface 11 against which the tapered surface 12 on the driving member 4 is tightly drawn when the nut 9 is tightened on the threaded portion 8a of the collar member 8 and said nut 9 is adapted to be locked against the inner surface 9a of the housing 3.

The washer 7 and nut 6 serve to retain the hub 10 and therefore the complete coupling on the tapered seat on the shaft 1 as shown. The dotted lines in Fig. 2 represent a larger type of driving lug 4a.

In Fig. 3 is shown a slightly different form of the invention in that the driving member 4 and the collar 13 having the threaded portion 14, are formed separately and secured together by the engagement of the tapered surfaces 11 on the member 4 and 12 on the collar 13.

With the construction of the present invention it is merely necessary to loosen the nut 9 to an extent where the driving member may be rotated to obtain desired axial adjustment of the driving lugs 4a and then retain the driving member in such axial position while tightening the nut 9 on the collar 8, as previously described, the driving lugs will be locked in such adjusted position and thereby the driving lugs may be easily and quickly adjusted to fit the angular requirements of any timing gear regardless of whether the magneto is to be mounted for clockwise or anti-clockwise rotation.

From the foregoing it will be seen that I have provided simple, efficient and economical means for obtaining all of the objects and advantages of the invention.

Having described my invention, I claim:

1. In an impulse coupling, a housing having a central aperture, a driving member having a portion extending into said housing and having lug means for connection of the driving member with an engine, said driving member being capable of rotation relative to said housing and having a collar having a threaded portion extending into said housing and an annular threaded member in said housing adapted to engage the threaded portion of said collar for locking said collar to thereby lock said driving member in operative position in desired degree of rotation relative to said housing.

2. In an impulse coupling including a housing adapted to be pivotally mounted on a magneto shaft and having a central aperture, a separate driving member adapted to be secured in operative relation with said housing at desired degree of rotation and having lug means for connection of the driving member with an engine, a threaded member engaging said threaded collar, said member having a tapered surface and a collar member having a portion extending into said housing and having a threaded collar for locking said driving member in fixed relation with said housing.

3. In an impulse coupling including a housing adapted to be pivotally mounted on a magneto shaft and having a central aperture, a separate driving member, said driving member having a collar extending into said aperture in said housing and having lug means for connection of the driving member with an engine and an annular member having means engaging said driving member and having a portion extending into said housing and secured therein for locking said collar to thereby lock said driving member in fixed relation with said housing.

4. In an impulse coupling, a housing, a separate driving member adapted to be secured to said housing at desired degree of rotation and having a collar extending into said housing, and having lug means for connection of the driving member with an engine, said housing and driving members having tapered engaging surfaces and means in said housing engaging said collar for locking said driving member in fixed relation with said housing and with said tapered surfaces in engagement.

WILLIAM D. CROCKER.

REFERENCES CITED

The following references are of record in the file of this patent:

UNITED STATES PATENTS

| Number | Name | Date |
|---|---|---|
| 123,413 | Newell | Feb. 6, 1872 |
| 1,031,016 | Mason | July 2, 1912 |
| 1,056,098 | Heins | Mar. 18, 1913 |
| 1,057,928 | Briggs | Apr. 1, 1913 |
| 2,161,956 | Robertson | June 13, 1939 |